United States Patent
Gulla'

(10) Patent No.: US 6,169,877 B1
(45) Date of Patent: Jan. 2, 2001

(54) HIGH DENSITY TV MOTION PICTURE DISTRIBUTION NETWORK

(75) Inventor: Vincenzo Gulla', Guidonia (IT)

(73) Assignee: Telecom Italia S.p.A., Rome (IT)

(*) Notice: Under 35 U.S.C. 154(b), the term of this patent shall be extended for 0 days.

(21) Appl. No.: 09/011,505

(22) PCT Filed: Jul. 29, 1996

(86) PCT No.: PCT/IT96/00155

§ 371 Date: Mar. 6, 1998

§ 102(e) Date: Mar. 6, 1998

(87) PCT Pub. No.: WO97/06637

PCT Pub. Date: Feb. 20, 1997

(30) Foreign Application Priority Data

Aug. 4, 1995 (IT) ............................................ RM95A0553

(51) Int. Cl.[7] .............................. H04H 1/00; H04H 7/00; H04B 7/185; H04N 7/10

(52) U.S. Cl. .................................. 455/3.1; 348/7; 348/8; 455/12.1; 455/6.3

(58) Field of Search ...................... 348/7, 10, 8; 455/3.2, 455/6.3, 12.1, 3.1

(56) References Cited

U.S. PATENT DOCUMENTS

| | | | |
|---|---|---|---|
| 4,099,121 | * 7/1978 | Fang | 325/4 |
| 5,291,554 | 3/1994 | Morales . | |
| 5,303,294 | * 4/1994 | Kimoto et al. | 380/5 |
| 5,381,476 | * 1/1995 | Kimoto et al. | 380/5 |
| 5,440,336 | * 8/1995 | Buhro | 348/13 |
| 5,509,073 | * 4/1996 | Monnin | 380/20 |
| 5,579,367 | * 11/1996 | Raymond et al. | 455/3.2 |
| 5,583,562 | * 12/1996 | Birch et al. | 455/3.2 |
| 5,603,077 | * 2/1997 | Muckle et al. | 455/3.2 |
| 5,696,560 | * 12/1997 | Songer | 348/436 |
| 5,801,754 | * 9/1998 | Ruybal et al. | 348/7 |
| 5,822,014 | * 10/1998 | Steyer et al. | 348/563 |

FOREIGN PATENT DOCUMENTS

| | | | |
|---|---|---|---|
| 0 506 435 | * 9/1992 | (CA) | H04N/7/167 |
| 0 277 451 | 8/1988 | (EP) . | |

OTHER PUBLICATIONS

IEEE Transactions on Consumer Electronics, vol. 38, No. 3, Aug. 1, 1992, New Yor, NY, US. pp. 296–299, XP000311857; Kenji Nakashima et al; HDTV Broadcast, from Studio to Home.*

By K. Nakamura et al., "HDTV Transmission Service Now Available in the Satellite Video Communication Service", *NTT Review,* vol. 5, No. 3, May 1, 1993, Tokyo, Japan, pp. 58–61.

By K. Nakashima et al., "HDTV Broadcast, From Studio to Home", *IEEE Transactions on Consumer Electronics,* vol. 38, No. 3, Aug. 1, 1992, New York, pp. 296–299.

* cited by examiner

*Primary Examiner*—Andrew I. Faile
*Assistant Examiner*—Hai V. Tran
(74) *Attorney, Agent, or Firm*—Young & Thompson

(57) ABSTRACT

High definition TV motion picture distribution network via satellite comprising a service center (5) for the management and the commercial/administrative planning, a network control center (3) which controls the network both as regards the transmission via satellite (2) and the monitoring of the receiver terminals (4', 41, . . . 4'"') through the terrestrial network (6), the receiver terminals being provided with data recording device (22), a high resolution decoder (23), and a control unit (24) which stores and processes again information related to the operation of the terminal (4). Transportable units (1) directly linked to the satellite (2) allow to transmit live pictures through the network.

9 Claims, 3 Drawing Sheets

HIGH DENSITY TV MOTION PICTURE DISTRIBUTION NETWORK

TECHNICAL FIELD

This invention relates generally to distribution techniques of HDTV images (High definition TV) via satellites, and more particularly it relates to a network allowing to transmit or distribute a motion picture directly to cinema halls, to record and to reproduce it on a large screen, and moreover to distribute live pictures to cinema halls with a remote monitoring suited to a centralised management of cinema halls.

BACKGROUND ART

EP-A-0 506 435 relates to a method of trasmitting subscriber information to subscription television signal distributors and methods for converting a television signal decoder to accept digital television signal. It has particular application to so-called "conditional access" multichannel television systems, where the viewer may have a conditional access to several channels. The technique described, which in any case provides a protection from unauthorized subscribers and pirates through scrambling and descrambling the encoded signals, doesn't refer to a specific application in the motion picture distribution network and it does not face the problems about reducing the cost due to the number of copies in circulation, about increasing life of copy and the quality of the projected images or preventing any kind of illegal reproduction.

The presently used film distribution system provides for the production of a limited number of copies which are reserved for said distribution which initially takes place only in cinema halls of the most important cities and only later in cinema halls of towns.

The copies which have been produced have a limited life and the image quality deteriorates in a direct functional relationship according to the number of film-shows performed with this copy, at the expense—in some cases—of the quality of successive film-shows.

Moreover, the conventional motion picture distribution system has the serious drawback that it is easily exposed to an illegal reproduction (piracy).

In order to increase the interest of the public for the cinema and to reduce the management cost of cinema halls, some time ago the concept of a multiroom has been developed, according to which the cinema halls usually containing some hundreds of persons have been divided up into rooms having a capacity of ten spectators or some multiple thereof, so that it is possible to show various movies at the same time.

According to this concept the art of entertainment has developed multiservice centers: cinema halls are combined with commercial centers so as to offer a variety of services which becomes more and more diversified.

The need to centralise simultaneous management of a plurality of cinema halls is becoming urgent, and it satisfies the prerequisite of allowing a better use of human resources and a more rapid coordination of the cinema halls which can be used for cultural programmes in video-conferences, advertising for a new product, tele-education, and so on.

In order to satisfy the above necessities, the technology related to digital signal coding and transmitting can nowadays make available on the market, motion pictures production and processing systems, having a high resolution, and if said systems are combined with telecommunication systems via satellites, they provide a valid means for the implementation of a high definition TV (HDTV) image distribution services with high quality and for professional application. In particular, the application concerning tele cinema transmission will be considered, according to which the celluloid film and the projection machines are replaced by modern apparatus obtained from computer technologies, suited to store in their memory a movie which may last for hours and which is adequately coded, or to reproduce images on large screens.

According to the state of the art, experiments have been carried out on the image distribution technique to cinema halls, both in Europe and in the USA, using satellites or cables.

In particular, it is known that in the USA a HDTV motion picture distribution network has been realized, wherein the digital transmission is performed by means of optical fibres, in ten experimental locations. On the other hand, live picture distribution via satellites employing dedicated analogue techniques is being tested in France for cinema halls of towns.

Both these image distribution techniques cannot solve in an exhaustive manner all the above mentioned problems of the conventional method of film distribution, by providing an adequate motion picture distribution network via satellite.

DISCLOSURE OF INVENTION

An object of the present invention is to provide a HDTV motion picture distribution network which automates the apparatus for receiving and reproducing the motion pictures, through the transmission of remote controls for remote monitoring of the correct operation of the terminals.

A last object of the invention is to provide a HDTV motion picture distribution network which uses standard components so that said components are easily found to thereby facilitate their maintenance and have operating frequencies in conformity with the standards of international rules, so that their applications will have a large diffusion and a low cost.

The above and other purposes which will be apparent from the description are attained by a high definition TV motion picture distribution network via satellite, comprising:

I) a service center for the management and commercial/administrative planning of film distribution in the various cinema-halls;

II) a network control center which performs the following operations:

transmitting filed movies assigned by the service center, to the addressees or users, according to the planning of the service center;

enabling of the receiver terminals of the users by means of the network software, which checks the situation of the terminal; wherein the control center puts into effect all the access and diagnostic functions via cable lines;

check of the quality of the transmission via satellites by monitoring both the transmission terminal and the receiver terminals;

promoting the maintenance of the receiver terminals in the event of malfunctions;

determining the modalities how the data are to be transmitted again to those receiver terminals which showed to have anomalies in recording and in the quality of the received signal;

coordination of transportable units for the transmission of the live picture shooting, enabling the user terminals to receive the signal;

III) a plurality of receiver terminals, each of them comprising:
a receiver for receiving TV signals from a satellite, a demodulator, a digital recording apparatus, a decoder and an apparatus for the projection of the movie on a large screen according to different high definition standards, wherein these constituent blocks or components are interfaced with a control unit performing the telemetering and detection functions on the blocks comprised in the receiver terminal; wherein the control unit stores and processes again the information related to the operation of the terminal, said control unit being directly linked by dedicated communication protocols and via cable telephone lines to the network control center;

IV) transportable units for the shooting and transmission of live pictures, which units are directly linked to a satellite during transmission and monitored by the control center of the network.

Further advantage achievable by further embodiments of the invention is to provide a HDTV motion picture distribution network, employing a single digitized copy of the movie to be transmitted, so as to reduce noticeably the cost due to the number of copies, and to increase the life of the copy, which also turns to the advantage of the quality of the projected images and prevents any kind of illegal reproduction.

A further advantage of the invention is to provide a HDTV motion picture distribution network, allowing to show live pictures on motion picture screens, using this service network.

BRIEF DESCRIPTION OF DRAWINGS

In order to better illustrate the invention and without limiting in this way its generality and the field of its possible applications, in what follows a preferred embodiment thereof will be described with reference to the annexed drawings, in which.

BEST MODE OF CARRYING out THE INVENTION

Figure 1:
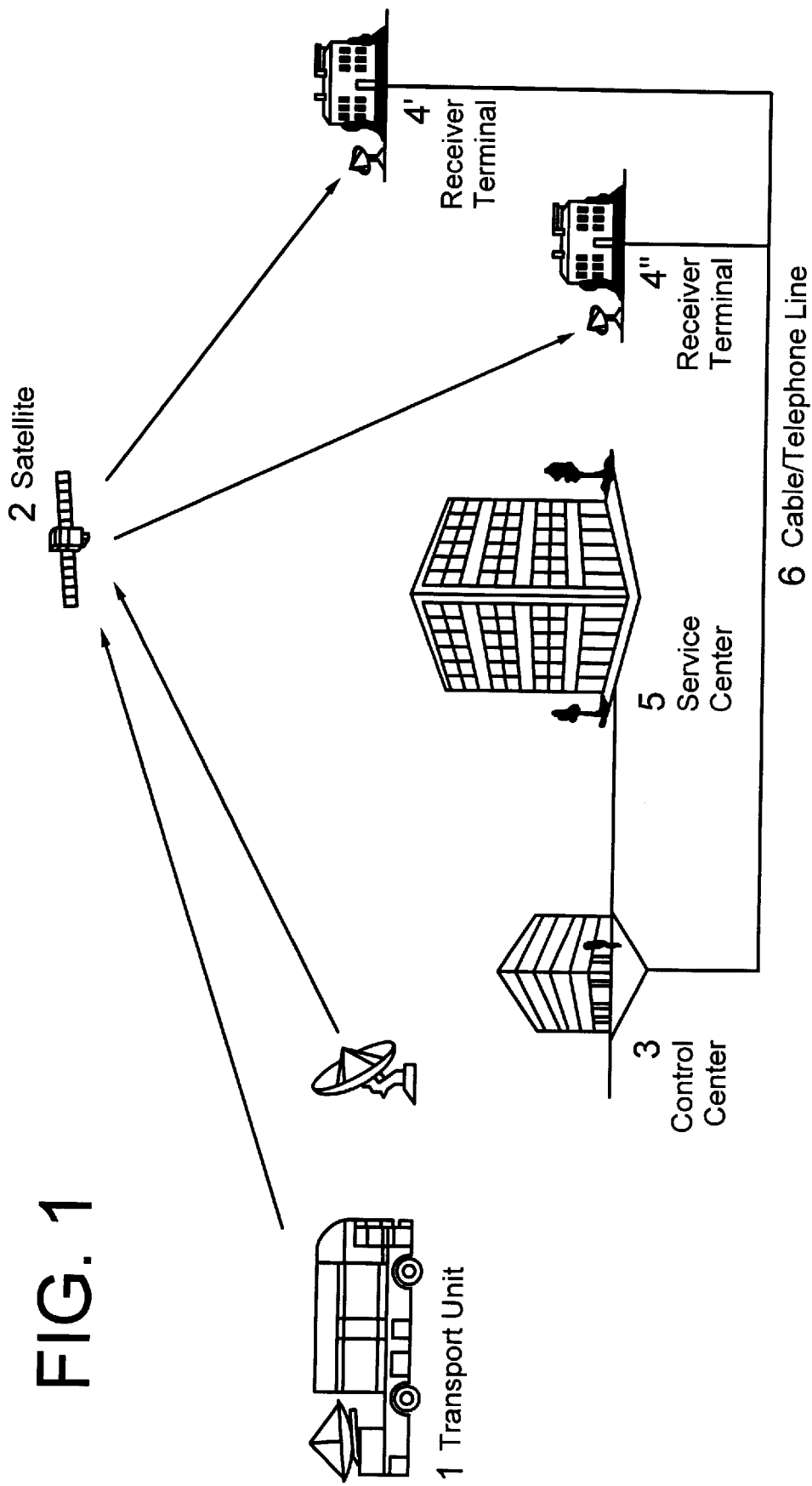
FIG. 1 shows a general view of the whole motion picture distribution network via satellite.

With reference to FIG. 1 the distribution network has a star-like configuration extending from and around the transmission and control center 3 of the network, which is directly connected to the service center 5 and is hierarchically dependent from the latter as concerns the exercise of this service. The archives (files) of the films are kept inside the control center 3 of the network,in order to maintain the control over the data source and in order to avoid other unforseen connections. The shootings for live pictures are performed by transportable units 1 which have a direct access to the satellite 2 and the signal is received only by terminals enabled by the control center 3. Besides the connection via satellite for the transmission of HDTV images there is provided a return connection with the control center of the network for the monitoring of the terminals 4',4".

Figure 2:
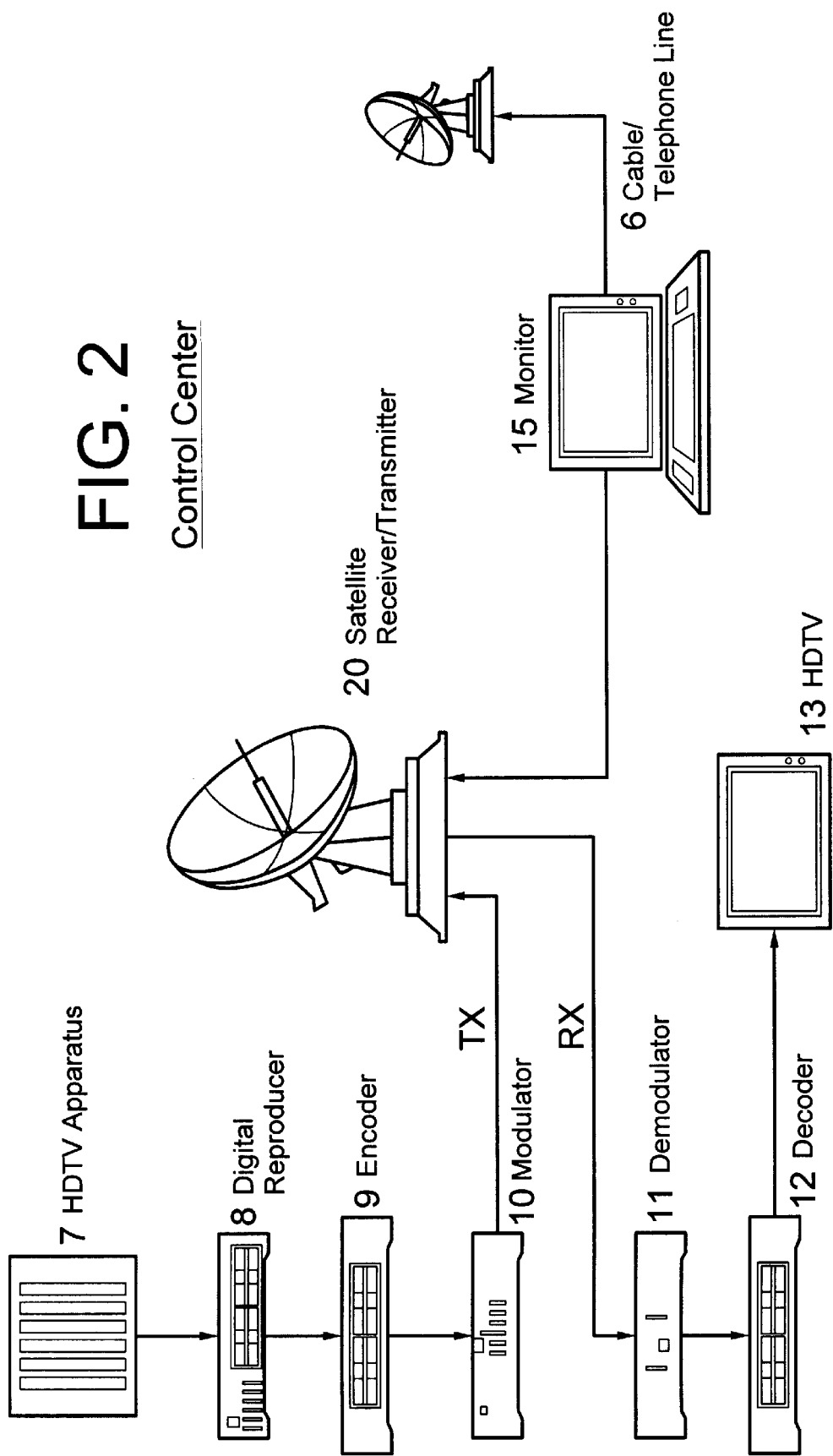
FIG. 2 shows the constituent blocks or componements of the control center 3 of FIG. 1.

In order to reduce the cost of this network and because of the low prerequisites with respect to data traffic, monitoring of the network is done via cable lines 6. The operations of transmission to the satellite and of control of the receiving terminals are performed by a control center specialized in the management of the network and which is responsible for the correct operation of the apparatus and of the continuity and quality of this service. The control center 3 of the network is shown according to its minimum configuration in FIG. 2. The transmission to the end users of the films stored in the archives and the transformation of the film in a digital signal, is carried out sequentially by the functional blocks comprising HDTV apparatus 7, a digital reproducer 8, an encoder 9 and a modulator 10 which transmits the 20–30 Ghz signal, along the line TX.

According to a preferred embodiment, the transmission via satellite is carried out by a stationary terminal with an irradiation power of 70 dbW, to allow signal reception via satellite by means of antennas of 1,2 m.

The signal transmission rate may be 34 Mbit/s or 45 Mbit/s according to the desired image quality. MPEG-1 HDTV encoding systems may be applicable as well. The connection parameters ensure a service availability not less than 99%, by using a QPSK modulation (quadrature phase shift keying) with ½ FEC or ¾ FEC. As has been said above, besides enabling the receiver units 4',4", the control center checks also the quality of the transmission via satellite.

Monitoring of the receiving terminals may be obtained alternatively at a centralised level (by providing in the control center on the line RX a demodulator 11, a decoder 12 and a monitor HDTV 13 for the image reproduction, and a monitor 15 for a general control of the network, which is interfaced with the telephone lines 6) or at a local level, according to the network dimensions and the number of terminals to be managed.

Figure 3:
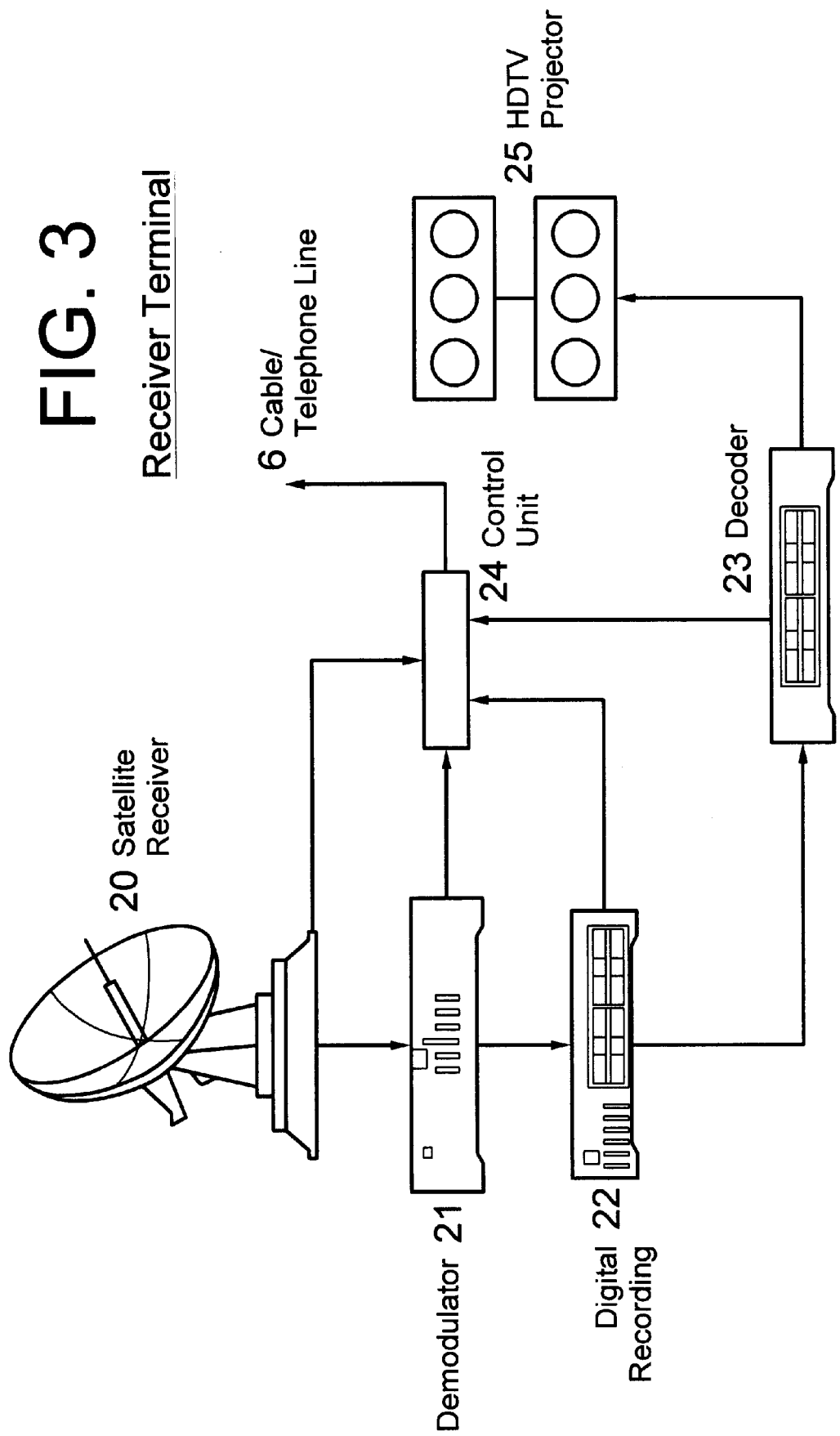
FIG. 3 shows the constituent blocks or components of a receiver terminal 4 of FIG. 1.

A receiver terminal 4, as shown in FIG. 3, comprises a receiver via satellite 20, a demodulator 21, an apparatus for digital recording 22, a decoder 23, a control unit 24 and an apparatus for HDTV motion picture projection 25 on a large screen.

According to a preferred embodiment, at the level of the receiver 20, the terminal is suited to receive a digital signal with a transmission rate of 34–45 MPEG-2 HDTV bit rates transmitted from the satellite system ITALSAT, operating on the band Ka. The technical features of the receiver 20 ensure a noise pattern which is better than 24 dB using antennas of 1,2 m. The low noise block (LNB) of the receiver converts the signal of the Ka band (20/30 Ghz) to the band L(1–1.6 Ghz). The noise temperature of the LNB is less than 180° K. The output signal from the LNB is demodulated through a QPSK digital demodulator 21 with the standard IDRIESS 308 and suited to manage a data rate of 34–45 Mbit/s. For MPEG-2 HDTV applications, an appropriate MPEG-2 demodulator will be adopted, when made available to the market. The output of the demodulator 21 is a digital signal having an electric standard G703.

The system is applicable also to other frequency bands, for instance Ku (12–14 Ghz).

In this case the antenna and the related parameters (LNB, G/T antenna diameter) will assume different values to be determined according to circumstances.

A general-terminal 4 designed to receive and reproduce the HDTV image for the film distribution network is based on the following operational specifications with respect to protocols and network access:

protocols for signal transmission in a wide-band;
protocols for network communication and monitoring.

With respect to the first type, in the network configuration, the wideband signal containing the information of the distributed movies is transmitted via satellite; the transmission protocol has the task of communicating with receiver terminal 4 for the control of the quality of the transmitted signal, through a check of the reception parameters.

The signal is therefore decomposed into packets having a predetermined length. Every packet is numbered so as to be easily identified and substituted in case it does not correspond to quality standards. The packets have a structure including a heading which is followed by information data. The heading contains the sequence data of the packet, so as to permit to reconstruct the original flow of the movie. The packet length and the numbering algorithm are experimentally determined. The necessity of remote monitoring of the terminals is fulfilled using network communication and monitoring protocols which enable the communication, providing for the sending of messages and control signals at predefined addresses. The protocol allows the control center of the network to perform some basic operations like:

polling or interrogation of the selected terminals;

narrowcasting, or data distribution to a limited and selected number of terminals;

broadcasting, or data distribution to all terminals.

The terminals which receive the control signals and data signals, send a message to confirm their reception (acknowledge). The communication protocols provide for the reply function. The format of the reply protocol includes a heading containing the receiver addresses of the message, the sender and the transmitted information.

The length and the format of the messages are experimentally defined.

The communication with the terminals requires an access technique allowing all terminals 4 to successfully send messages containing the required data, or simply the return of the "acknowledge" messages to the network control center, wherein the preferred access technique is the "slotted aloha".

The system characteristics are such as to satisfy the specific technical necessities depending on the dataflow and data nature, and on the demand to preserve them in a protected enviroment.

The signal at the output of the demodulator 21 may be directly sent to the decoder 23 or it may be stored in a device 22 developed specifically for this purpose, suited to receive a digital signal at a rate of 34–45 Mbit/s. The recording device 22 transforms the electric signals with standard characteristics G703 into a digital flow which is suited to be buffered. This interface comprises electronic components developed according to the I/O gates specifications. The received data are buffered in the memory banks managed by a CPU.

The output signal from the physical medium has the same properties as that originally received and may be reproduced when desired.

The memory of the recording device 22 comprises a physical non-removable medium, as for example a harddisk. The memory capacity in the 34–45 Mbit/s case, will be equal or greater than 35 Gbyte, so as to be able to store the data corresponding to a movie lasting more than two hours.

The recording device 22 has some piracy preventing functions, so as to protect the content of the memories from external intrusion or attempts of non-authorized reproduction.

For this purpose, during projection of the movie stored in the hard disk, a terminal recognition number is randomly introduced. This number is not visible during normal reproduction, but when the film is shown in slow-motion. This allows to determine in an univocal way the relation between a receiver terminal and the illegal copy of the movie reproduced from it by means of a piracy action.

This is accomplished by the software residing in the recording apparatus, which insets in a random way and in a different way for each projection, a plurality of coded pixels with a frequency which is lower than eighteen images/second.

The recording apparatus is further protected from external non-authorized tampering, by means of a self-destruction technique of the content of the memories.

This allows to obtain a protection against possible attempts to remove the hard disk.

The memory erasure function is activated by electromechanical devices (microswitches and anti-intrusion sensors).

The software of the recording unit 22 comprised in the terminal, is suited to reconstruct the received movies (ordering the received communication packets), according to the sequential predetermined numbering.

If a packet does not correspond to quality standards, the terminal software eliminates this packet and provides for its substitution. The communication between the terminal and the control center is realized by means of the two transmission means provided for. Based on recommendation 601 of CCIR the HDTV standards may be:

1250 rows, 50 Raster/sec 1125 rows, 60 Raster/sec

Europe has adopted the standard 1250/50 whereas Japan and USA have chosen the standard 1125/60. The coding system of the motion picture distribution terminal is compatible with both standards.

The chosen data flow of 34/45 Mbit/s is obtained by compressing the data of the original image, by means of a DCT type algorithm of compression with Motion Compensation and Variable Length Coding functions.

To the video digital signal there are associated three or four audio, stereo or digital channels (equivalent to 6 or 8 monochannels), of CD quality, I/O corresponding to the AES/EBV standard or the analogue type. The decoding apparatus must be compatible with the encoder.

The output signal from the decoder 23 will be an analogue signal, which can drive a TV monitor 16/9 or a high definition projecting machine 25.

Some control activities are locally carried out by the single terminals; the control unit 24 of the terminal is formed by a computer adapted for this purpose, with a software suited to perform the following functions:

to receive the diagnostic data of the whole terminal 4 and to send to the network control center 3 all the anomalies which have been detected;

to send a report or statement on the quality of the received signal, based on the quality data measured at the output of the demodulator 21 (measure of the BER, bit error rate);

to interpret and to perform the controls sent by the control center;

to enable the terminal 4 to receive the signal after having interpreted the password.

The control unit 24 performs, via software, some additional functions related to the management of this service, like:

counting of the number of projections;

inhibiting the terminal to reproduce the content of the memories. This function may be put into effect on demand of the control center 3 or when the maximum number of authorized projections has been reached;

sending the collected data to a processing center.

The access to the terminal 4 is authorized each time by the network control center 3 which uses the two transmission media which connect it to the terminal. The access ta the terminal for the maintenance is controlled by the control center, always sending a pair of recognition keys. The software access keys are chosen on the basis of reproducibility preventing criteria and safety criteria according to military standards.

The control unit must provide for the access via cable line. The receiving terminal may be upgraded to transmit voice or low speed video signals, originated locally, to a selected number of cinema halls connected to the HDTV distribution network, so to implement the technical background for interactive and multimedia applications.

The projecting machine 25 plays a very important role for the determination of the quality of the image reproduced on the large screen, and for this reason it is selected according to qualitative and technological properties which are directly related to the size of the screen and the selected cinema. The projecting machine is compatible with the standard 1250/50 and 1125/60.

The role played by the control center 3 is evident; it sends enabling signals which allow a communication between the terminal 4 and the satellite 2 only if the terminal 4 is effectively enabled thereby providing for an additional protection of the bit string transmitted by the satellite.

INDUSTRIAL APPLICABILITY

It is also apparent how the work necessary for the management of a cinema-hall or a multi-room cinema-hall will be minimised and at the same time the movie is more protected.

This service may be implemented in Italy using a national spatial segment ITALSAT belonging to Telecom Italia until now employed for experimental work. The frequency band of ITALSAT coincides with the frequency band assigned in Europe by IFRB for HDTV distribution service via satellite.

Particularly the cinema-halls of the suburbs will draw advantage from this service, since, due to the fact that long waiting periods for the film distribution caused by a limited number of copies to be necessarily initially shown in a first view cinema hall are eliminated, the cinema-halls of suburbs will have an occasion to promote first views in the suburbs simultaneously with films-hows in the halls of great cities.

Also the service related to live picture shooting may have various applications, for instance in relation to soccer-matches on sunday and in particular out matches, which will in this way draw the attention of those fans who cannot follow their team for various reasons; moreover cultural shows like the "premiere" of an opera or public meetings will give rise to more interest. A last advantage of the present invention to be put in evidence, is that those who will mostly benefit by this remote control cinema service will be the owners of more than one cinema-hall or those who run multi-room halls, since they will profit from a reduction of the management costs and will have increased commercial opportunities.

As a matter of fact, the system itself must be considered as a means to approach the introduction of multimedia and interactive services to the cinema market.

What is claimed is:

1. High definition TV motion picture distribution network via satellites, comprising:

I) a service center for management and commercial/administrative planning of film distribution in a plurality of cinema-halls;

II) a network control center (3) which performs the following operations:

transmitting filed movies assigned by the service center, to addressees or users, as directed by the service center;

enabling user receiver terminals (4', 4", . . . 4"') via network software, which checks a status of each said terminal; wherein the control center effects all access and diagnostic functions via cable lines (6);

monitoring quality of transmission via satellites by monitoring both a transmission terminal and receiver terminals;

promoting maintenance of the receiver terminals (4', 4", . . . 4"') in the event of malfunctions;

determining modalities as to how data is to be re-transmitted to those receiver terminals which showed anomalies in recording and in quality of received signal;

coordinating transportable units (1) for transmission of live picture shooting, enabling the user terminals (4', 4", . . . 4"') to receive a signal;

III) a plurality of receiver terminals (4', 4", . . . 4"'), each comprising:

a receiver (20) for receiving TV signals from a satellite, a demodulator (21), a digital recording apparatus (22), a decoder (23) and an apparatus (25) for projection of a movie on a large screen according to different high definition standards, wherein constituent blocks or components (20, 21, 22, 23, 24, and 25) are interfaced with a control unit (24) performing telemetering and detection functions on the blocks (20, 21, 22, 23, 24 and 25) comprised in the receiver terminal; wherein the control unit (24) stores and re-processes information related to operation of the terminal, said control unit being directly linked by dedicated communication protocols and via cable telephone lines (6) to the network control center (3);

IV) transportable units (1) for shooting and transmission of live pictures, which units are directly linked to a satellite (2) during transmission and monitored by the control center of said network (3).

2. High definition TV motion picture distribution network via satellites, according to claim 1, wherein monitoring of a receiver terminal is performed centrally, by providing in the control center a demodulator (11), a decoder (12) and a HDTV monitor (13) for image reproduction, and providing further a monitor (15) for a general control on the network which is interfaced with the cable lines (6).

3. High definition TV motion picture distribution network via satellite according to claim 1, wherein quality control of a transmitted TV signal is performed by implementing protocols for wideband communication between a satellite (2) and receiver terminals (4', 4", . . . 4"'), wherein the transmitted TV signal is decomposed into packets having a predetermined length and each packet is numbered, so as to be easily identified and substituted in case it does not correspond to predetermined quality standards.

4. High definition TV motion picture distribution network via satellite according to claim 1, further comprising means for effecting, at the network control center, communication with and monitoring of receiver terminals (4', 4", . . . 4"')

having predetermined addresses, in which means communication protocols with the following functions are implemented:

polling, comprising interrogation of selected terminals;

narrowcasting, comprising data distribution to a limited and selected number of terminals;

broadcasting, comprising data distribution to all terminals.

5. High definition TV motion picture distribution network via satellite according to claim 1, wherein a receiver terminal is arranged to directly send the output signals from a demodulator (21) to a decoder (23) or to store them in a device (22) designed for this purpose, adapted to receive a digital flow at a predetermined rate, wherein the device (22) transforms the electric signal with standard characteristics into a digital flow adapted to be buffered and wherein the memory of the device (22) is embodied as a non-removable physical medium.

6. High definition TV motion picture distribution network via satellite according to claim 1, wherein each time a stored movie is projected, a specific recognition or identification number of a corresponding terminal is randomly introduced by software residing in a recording apparatus, and wherein this number is not visible during normal reproduction but only in slow-motion, thereby determining specifically a relation between said terminal and a "copy" of the film possibly reproduced by an action of piracy from this terminal, and wherein this number is localized in the frame randomly and differently, inserted with a frequency below eighteen images/second for each projection, coded and displayed by means of a plurality of pixels.

7. High definition TV motion picture distribution network via satellite according to claim 1, protected from non-authorized external tampering by a self-destruction technique of memory content, wherein a memory erasure function is performed by a microswitch, anti-intrusion sensors or other electromechanical devices.

8. High definition TV motion picture distribution network via satellite according to claim 1, wherein local control operations are performed by each terminal (4', 4", . . . 4"') by the control unit (24) included therein which:

collects diagnostic data of a terminal (4) and sends to the network control center (3) information about anomalies which have been found;

sends a report or statement on quality of the received TV signal, based on quality data measured at an output of the demodulator (21) in a user terminal;

interprets and effects control signals sent by the control center;

enables a terminal (4) to receive a TV signal after a key or password has been interpreted.

9. High definition TV motion picture distribution network via satellite according to claim 1, wherein additional operations of local control are performed by each terminal (4', 4", . . . 4"') by the control unit (24), which:

performs counting of a number of film-shows;

inhibits each terminal from reproducing memory content, on demand of the control center (3) or when a maximum number of authorized projections has been reached;

sends collected data to a processing center.

\* \* \* \* \*